US009497643B2

(12) United States Patent
Granda et al.

(10) Patent No.: US 9,497,643 B2
(45) Date of Patent: Nov. 15, 2016

(54) AUTOMATED MESSAGE ENUMERATED NOTIFICATION

(75) Inventors: Shawn F. Granda, Novi, MI (US); Anthony J. Sumcad, Southfield, MI (US); Kevin R. Krause, Plymouth, MI (US)

(73) Assignee: General Motors LLC, Detroit, MI (US)

( * ) Notice: Subject to any disclaimer, the term of this patent is extended or adjusted under 35 U.S.C. 154(b) by 1668 days.

(21) Appl. No.: 12/651,439

(22) Filed: Dec. 31, 2009

(65) Prior Publication Data

US 2011/0159868 A1   Jun. 30, 2011

(51) Int. Cl.
*H04W 24/00* (2009.01)
*H04W 24/02* (2009.01)
*H04L 12/24* (2006.01)
*H04W 24/06* (2009.01)

(52) U.S. Cl.
CPC .......... *H04W 24/02* (2013.01); *H04L 41/0816* (2013.01); *H04L 41/5061* (2013.01); *H04W 24/06* (2013.01)

(58) Field of Classification Search
CPC ............. G06F 11/263; G06F 11/0748; G06F 11/079; G06F 11/2273; G06F 11/321; G06F 11/323; G06F 11/3636; G06F 21/554; G06F 21/566; H04L 41/0816; H04L 41/16; H04L 41/5061; H04L 41/5074; H04L 63/1408

USPC ........ 455/423–425; 370/241–253, 216–228; 712/E9.006, E9.015; 379/1.01–35; 702/58, 59, 182, 183, 185; 705/304, 705/305

See application file for complete search history.

(56) References Cited

U.S. PATENT DOCUMENTS

| 5,463,670 A | * | 10/1995 | Chiang et al. ............ 379/27.04 |
| 2005/0081108 A1 | * | 4/2005 | Shabalin ........................ 714/38 |
| 2008/0178042 A1 | * | 7/2008 | Mochizuki et al. ........... 714/25 |

OTHER PUBLICATIONS

Merriam-Webster Online Dictionary printed on Jun. 7, 2012.*
Webster's II New Riverside University Dictionary, The Riverside Publishing Company, 1988.*

* cited by examiner

*Primary Examiner* — Ronald Eisner
(74) *Attorney, Agent, or Firm* — Leydig, Voit & Mayer, Ltd.

(57) ABSTRACT

The described method and system provide a connectivity problem resolution mechanism that uses a data mode call in order to diagnose a connection problem while avoiding audible ringing and or inadvertent user pick-up during error diagnosis and correction. The system includes three primary functions and elements including cellular error message recognition, error response handling configured to update and/or maintain processes, and new error message capture. This system is usable both online and offline. Error recognition may be based on error message matching or keyword matching.

27 Claims, 5 Drawing Sheets

AUTOMATED MESSAGE ENUMERATED NOTIFICATION

BACKGROUND OF THE INVENTION

As mobile communications devices have become increasingly popular, the challenges associated with maintaining devices and networks in functional condition have also increased. With so many devices, so many networks, and so many intervening nodes, the number of possible errors and error combinations is enormous. For example, even a single user may experience a communication problem that is due to his or her phone or to the call center, or to a node between the two. With respect to each of these potential error sources, there are numerous potential error modes and mechanisms.

Most users do not have the technical knowledge or access to resources required to resolve substantial communications problems. Moreover, it is difficult for a third party with such knowledge to assist the user remotely. Currently, when communications problems arise, human advisors will often attempt to check the status of a mobile dialing number (MDN/MIN) by manually dialing the number with a telephone, and then listening for a response (e.g., the user's recorded message). Next the advisor defines and executes a number of corrective actions or steps depending upon the nature of the connection achieved with the remote device.

This system of dialing a number, listening to a response, and then defining and executing corrective measures has numerous drawbacks. For example, it is time-consuming. Moreover, the dialing of a number with a standard voice telephone can occasionally result in a connection to a live person instead of the targeted device, e.g., a customer's vehicle telematics unit. Not only does this not assist in solving the user's problem; it also presents an awkward social situation that the advisor must gently resolve before continuing to attempt to solve the communications problem of interest.

An advisor may spend ten minutes or more on technical calls attempting to troubleshoot each subscriber issue. In addition, offline advisors are sometimes made aware of potential issues that could impact a subscriber's connectivity. While researching such issues, an advisor will often attempt to call the number in the vehicle for some direction on next steps, depending on the message heard, or if the subscriber picks up.

For the above reasons and others, there is a long-felt and unresolved need for a system that assists is solving user connectivity problems by avoiding the use of human advisors to a large extent, and by providing more substantive guidance for problem solving when manual intervention by a live advisor is required, saving time and minimizing cost.

BRIEF SUMMARY OF THE INVENTION

The invention provides a problem resolution mechanism that initially attempts to connect to a vehicle in data mode, i.e., using carrier tones. This avoids audible ringing and any potential user pick-up in the telematics equipped vehicle, while still allowing the system to interpret the resulting connection, e.g., via receiving and interpreting an error message.

The system includes three primary functions or functional modules including cellular error message recognition, error response handling with ability to update and/or maintain processes, and capturing new error messages. This system is usable both online, where the customer is aware of the advisor's actions in real time, and offline, where the customer is not aware of the advisor's actions.

Other objects and advantages of the invention will become apparent upon reading the following detailed description and upon reference to the drawings.

DETAILED DESCRIPTION OF THE INVENTION

Figure 1:
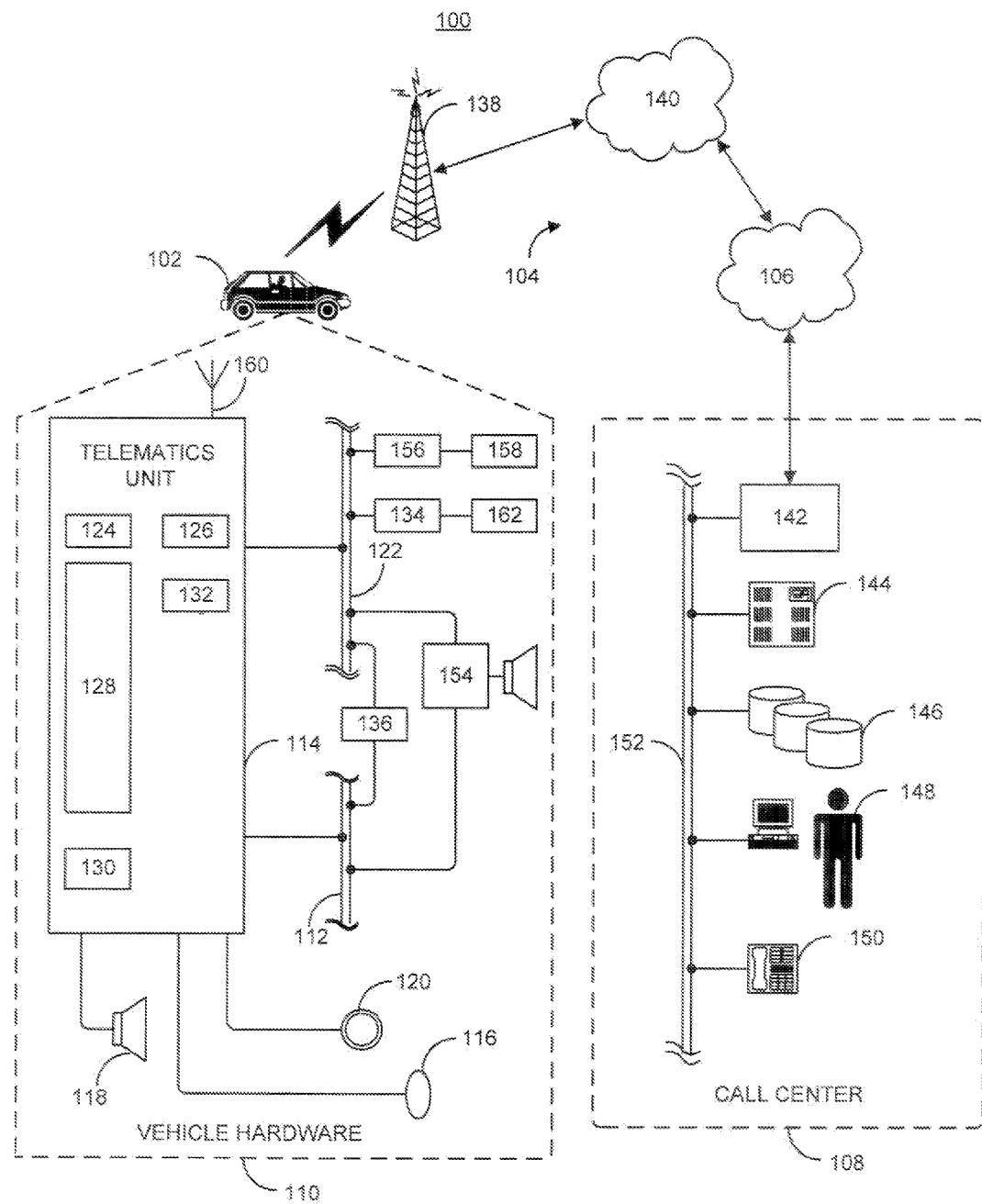
FIG. 1 is a schematic diagram of an operating environment for a mobile vehicle communication system.

Before discussing the details of the invention and the environment wherein the invention may be used, a brief overview is given to guide the reader. In overview, not intended to limit the claims, the invention provides a communication error resolution mechanism that executes cellular error message recognition, error response handling with ability to update and maintain processes, and capturing of new error messages. This system is usable both online as well as offline, where the customer is not aware of the advisor's actions. To begin problem resolution, the system connects to a vehicle telematics unit in data mode to avoid audible ringing within the telematics equipped vehicle, while still allowing the system to receive and interpret error messages.

Depending upon error messages received during the data call, the system will automatically select and execute a corrective action, e.g., updating internal account parameters or requesting that the cellular provider re-enable a particular phone number. For example, if the system receives the message "the cellular number you have called is not active," it recognizes the error message and takes appropriate action. In one implementation, upon receiving this message, the system automatically attempts to reactivate the device MIN/MDN via an interface with the appropriate carrier's provisioning system. The system may then notify the live advisor of the outcome and any required next steps.

Because communications systems tend to evolve fairly rapidly, it may be that the system receives an error message with which it is not familiar. In such a case, the system will send the message to an administrator to revise/update system definitions and processes. Additionally or alternatively, the system may search for key words in a previously unknown message, and may take action based on identifying such words. For example, the words/phrases "inactive," "deactivated," "not available," "outside coverage area," etc. may be used to trigger specific corrective activities.

In yet another implementation, which may be used to replace or to complement the above-mentioned handling of unknown messages, the audio from the cellular message may be captured and passed on to a live advisor.

Thus, with the described system, the live advisor's manual process can be shortened through a three part automated process that not only assists with the immediate communication problem, but also allows the system to learn new errors and solutions to facilitate the solution of future communications problems. The system thus includes three primary portions, namely automated cellular error message recognition, automated error response handling with the ability to update and maintain processes, and the capture/processing of new error messages.

The automated cellular error message recognition portion includes a set of respective identifiers, i.e., message number, message text etc., stored in a database, lookup table, or other data structure, for a set of known and recognized messages, with computer executable instructions on the same or different computer readable medium to recognize such messages. The set of known messages may include the set of all cellular messages played by one or more specific cellular providers.

The second portion discussed above consists of a service submitting the appropriate information for error resolution. This as well may consist of computer readable instructions on a computer readable medium for executing the required transmissions. In one example, the MDN/MIN ESN information is sent to the cellular provider of interest to re-enable the number on that network or to return the updated pairing information.

The third portion discussed above is related to the first part, but comes into play when an error message is not within the existing set of known error messages. In an implementation, this third portion, which facilitates learning of new error messages, notifies an administrator and also transmits the captured audio to the administrator upon detecting an unknown error message. The administrator or the detected remedial actions taken by that administrator are then used to update the set used in the first portion of the process, so that the previously unknown error message becomes part of the recognized set.

There are a number of usage scenarios for the system. In one scenario, an offline advisor is working to resolve a subscriber communications issue. In this scenario, the system allows for faster response and decreased advisor handling time. Furthermore, there is an increase in customer transparency and satisfaction due to the use of a data call instead of voice call. In a scenario involving inbound technical advisors, the system can be used for one or both of initial problem resolution, and subsequent retesting after resolution to ensure that any updates have corrected the previous issue. The use of this system during that call will significantly shorten the time needed to validate any changes.

Finally, the system may be used to execute a batched automated check on a group of predefined vehicles. In this usage scenario, the system auto dials the vehicles (i.e., telematics units) on that list, detects the cellular error messages, and processes predefined steps based on the cellular message returned.

Given this overview, an exemplary environment in which the invention may operate is described hereinafter. It will be appreciated that the described environment is an example, and does not imply any limitation regarding the use of other environments to practice the invention. With reference to FIG. 1 there is shown an example of a communication system 100 that may be used with the present method and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100; however, other systems not shown here could employ the present method as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (UN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128 one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128. The cellular chipset/component 124 and the wireless modem 126 may be called the network access device (NAD) 180 of the telematics unit 114.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various crash and or collision sensor interface modules 156 and sensors 158 located throughout the vehicle. Infotainment-related services where music, Web pages, movies, television programs, video games and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit 114 is capable of offering. It is anticipated that telematics unit 114 include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission. In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the OPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech. The vehicle hardware also includes one or more buttons or controls 120 for enabling a vehicle occupant to activate or engage one or more of the vehicle hardware components 110. For example, one of the buttons 120 can be an electronic push button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112.

The vehicle crash and/or collision detection sensor interface 156 are operatively connected to the vehicle bus 122. The crash sensors 158 provide information to the telematics unit 114 via the crash and/or collision detection sensor interface 156 regarding the severity of a vehicle collision, such as the angle of impact and the amount of force sustained.

Vehicle sensors 162, connected to various sensor interface modules 134 are operatively connected to the vehicle bus 122. Example vehicle sensors include but are not limited to gyroscopes, accelerometers, magnetometers, emission detection and/or control sensors, and the like. Example sensor interface modules 134 include power train control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. A component in the mobile switching center may include a remote data server 180. As appreciated by those skilled in the art, various cell tower/base station/MSC arrangements are possible and could be used with wireless system 104. For example, a base station and a cell tower could be co-located at the same site or they could be remotely located, and a single base station could be coupled to various cell towers or various base stations could be coupled with a single MSC, to but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (1P) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

Call Center (OCC) 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing.

The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

As noted in overview above, the system and method described herein enhance subscriber communication problem resolution through a unique combination of innovative strategies to improve the subscriber experience while reducing the time and cost associated with solving such problems. The system attempts to connect to a vehicle in data mode to provoke an error message and includes three primary modules for subsequent error message handling including cellular error message recognition, error response handling, and capture of new error messages.

Figure 2:
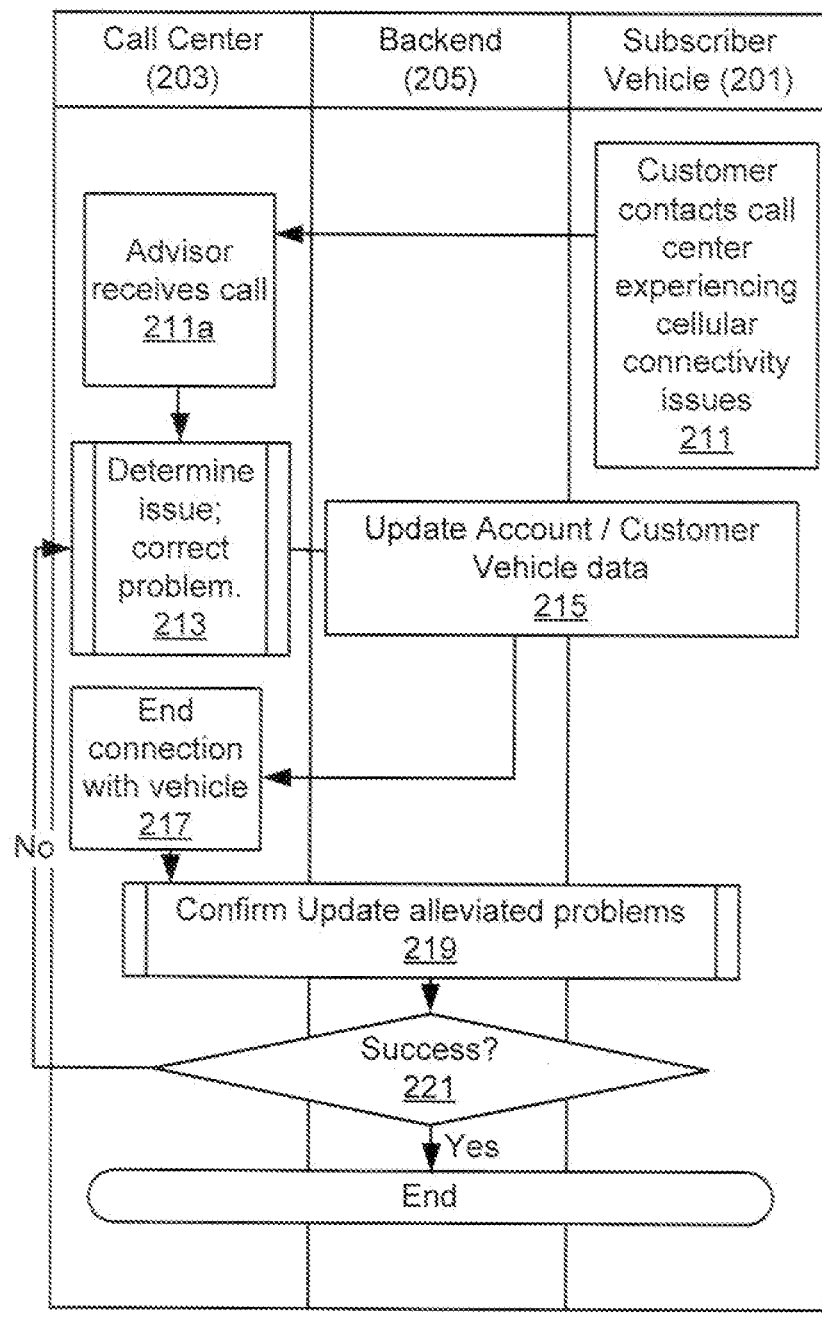
FIG. 2 is a structured process flow diagram showing a process according to a first usage scenario in keeping with an aspect of the described principles.

FIG. 2 is a structured flow chart showing communications and activities during a process of automated MDN/MIN enumerated notification. The entities involved in the illustrated process include the subscriber 201, the call center 203, and the communications network provider backend 205. The process stems from a connectivity problem perceived by the subscriber 201. In particular, at stage 211, the subscriber 201 contacts the call center 203 and notifies the center 203 of cellular connectivity issues, e.g., dropped calls etc.

The call center 203 receives the call at stage 211a. At stage 213, the call center 203 identifies the error, if any, that is affecting the subscriber's connectivity, via the trifurcated error handling mechanism described above. In this same stage, the call center 203 also corrects the identified problem as described above, e.g., by updating internal account parameters or requesting that the cellular provider re-enable the subscriber's phone number.

After correcting the noted problem at stage 213, the system updates the user account data at the back end 205 as well as the customer vehicle data at the subscriber vehicle 201 at stage 215, and the connection with the vehicle 201 is ended at stage 217. At this point, the system may confirm at stage 219 that the problem has indeed been eliminated. In an implementation, this entails making a data call to the vehicle, whether on a one-time basis or as part of a batch process, and capturing and processing any error messages as discussed above. If this check finds that the problem has been alleviated, as determined at stage 221, then the process ends. Otherwise, the process returns to stage 213, to reattempt the correct identification and resolution of the problem.

Figure 3:
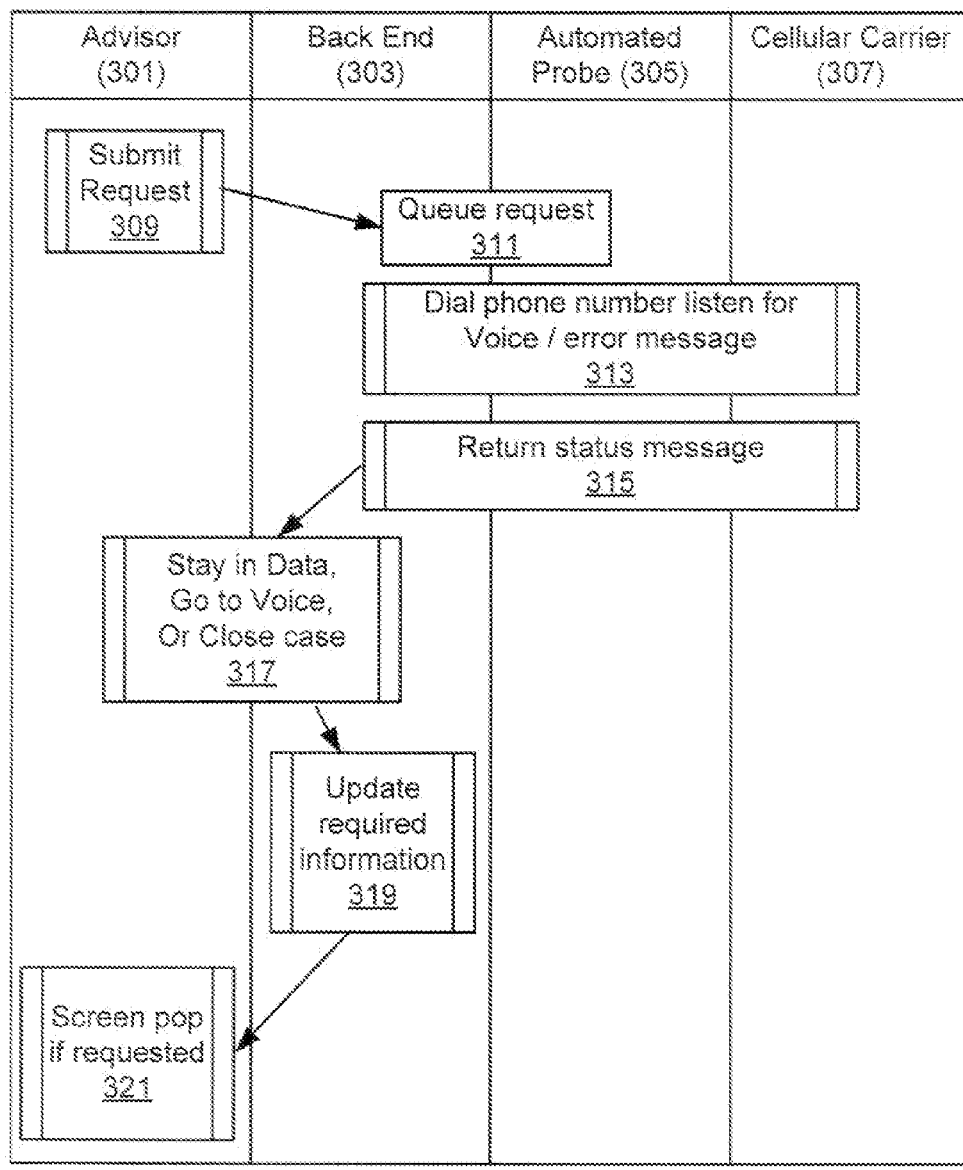
FIG. 3 is a structured process flow diagram showing a process according to a second usage scenario in keeping with an aspect of the described principles.

As noted above, it may be desirable to automatically check cellular connectivity without the continued involvement of a human advisor. This would allow for more efficient batch processing of requests, and would free advisors up to more efficiently multitask. An implementation of this type of automated error checking/correction is shown in FIG. 3, which is a structured flow chart showing activities at, and communications between, a call center advisor 301, a provider back end 303, an automated connectivity probe 305, and a cellular carrier 307.

At stage 309, the call center advisor 301 submits a request for a check of cellular connectivity to the provider back end 303. In conjunction with the automated probe 305, the back end 303 queues the request at stage 311, to await completion of any other ongoing requests, such as prior requests in the same batch or remaining requests from a prior batch, in the case of batch processing.

Once the pending request reaches the head of the queue, or in the event that there are no prior requests pending, the subscriber phone number associated with the request is called in data mode by the automated probe 305 at stage 313. In one implementation, the physical calling mechanism associated with the automated probe 305 is a standalone modem applying carrier tones that also listens for the various error messages. Once the automated probe 305 receives a response to the call, e.g., by receiving an error message, the probe 305 interprets the message and derives a status of the cellular subscriber's connectivity condition.

At stage 315, the back end 303 returns an indicator of the status to the advisor 301, who may then choose a further action based on the status. For example, at stage 317, the advisor, having received the status indicator, selects to stay in data mode, go to voice mode, or close the inquiry entirely. If the status indicates a problem that the user may be causing, e.g., by using equipment improperly, the advisor may choose the option to go to voice mode, whereas if the status indicates a problem that can be resolved without user intervention, the choice is made to stay in data mode. If there is no problem indicated by the status, then the inquiry is simply closed.

In the event that the case stays open, and the identified error is one that can be resolved from the call center, the call center makes the correction, either via the advisor or via automated correction as discussed above, and any required update information is updated at the back end 303 at stage 319. If the advisor has requested notification of resolution of the problem, a screen notification may pop up on a monitor or computer used by the advisor at stage 321, ending the process.

Figure 4:
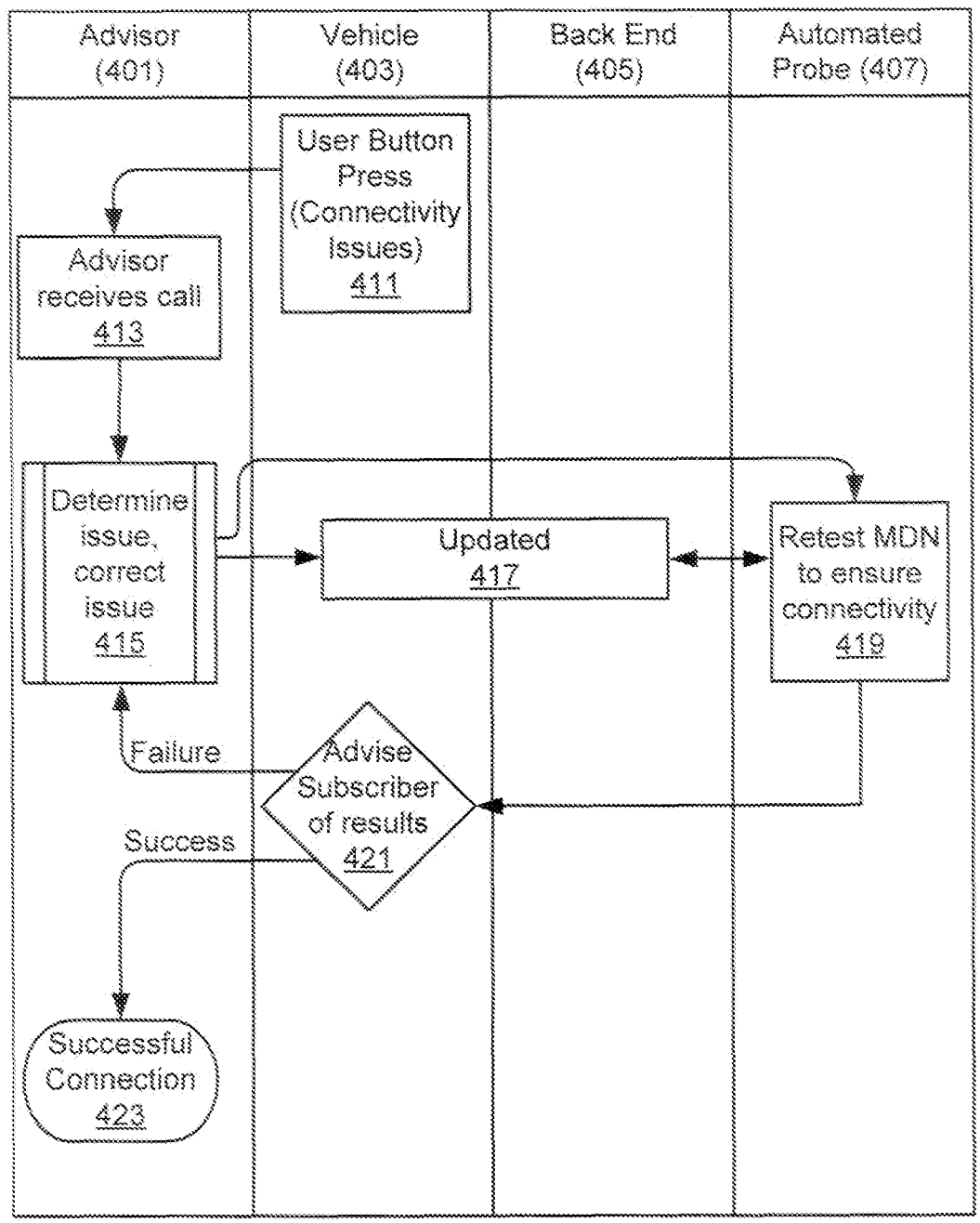
FIG. 4 is a structured process flow diagram showing a process according to a third usage scenario in keeping with an aspect of the described principles.

As noted earlier, it is also possible to use the adaptive error recognition system in keeping with the disclosed system to perform an automated retest function pursuant to advisor correction of an identified error. An example implementation of this usage, scenario is illustrated via the structured flow chart of FIG. 4. In this scenario, an advisor 401 corrects a connectivity issue for a subscriber (subscriber vehicle telematics unit 403) via the service provider back end 405 and the automated probe 407. Thus, at stage 411, the user who is experiencing the connectivity problem notifies an advisor, e.g., by pressing an appropriate button or other control element on their vehicle telematics unit. In response to the button press of stage 411, the advisor 401 receives a corresponding call at stage 413. In response, the advisor 401 attempts to identify and correct the problem, e.g., using a triage approach, at stage 415.

In an implementation, the telematics unit and backend 405 are updated in stage 417 to reflect the error correction executed by the advisor 401. At this point, the process flows to stage 419, wherein the automated probe 407 retests the connection as described above using a data test call in conjunction with automated error recognition and updating functions. The results of the retest 419 are passed to the subscriber in stage 421. If the retest determines that the connectivity issue has been corrected, then the process further flows to stage 423 wherein the advisor 401 is notified of the successful resolution.

If instead the retest determines that the connectivity issue has not been corrected, or if the retest detects another connectivity issue, then the process returns to stage 415 wherein the advisor 401 again attempts to restore cellular connectivity. From stage 415, the process continues as described above until the issue is successfully resolved or, in one implementation, until a maximum number of unsuccessful attempts, e.g., four unsuccessful attempts, is reached. In the event that an attempt limit is employed, the advisor may be prompted to report the connectivity issue to technical solutions department or the like for resolution after the final unsuccessful attempt.

Figure 5:
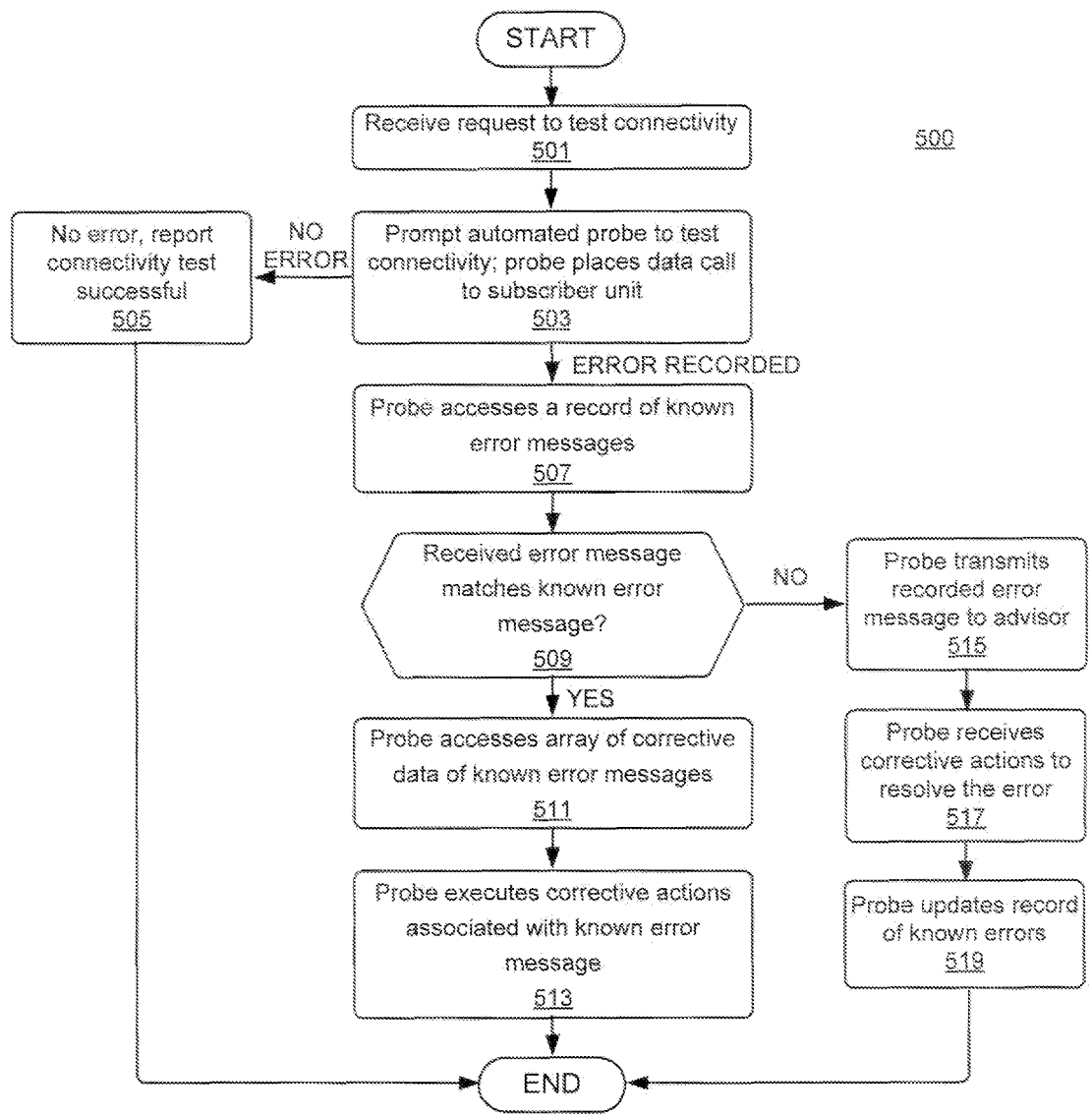
FIG. 5 is a process flow diagram showing a process for error detection and correction according to an aspect of the described principles.

In each scenario discussed above with reference to FIGS. 2-4, the trifurcated error resolution mechanism is employed in a slightly different role. In FIG. 5, the trifurcated mechanism itself is further detailed according to one implementation, although it will be appreciated that other variations are possible as well. At stage 501 of the process 500, the automated probe receives a request to test subscriber connectivity for a particular subscriber. As noted above, this may be an isolated request or may be part of a larger batch process. The probe then places a data call to the affected subscriber unit in stage 503. If the data call results in a successful connection, the process 500 terminates with a return message at stage 505 to the requester, e.g., an advisor, indicating that the connectivity is not defective.

If instead, the probe receives an error message, the message is recorded and the process 500 flows to stage 507, wherein the probe accesses a record of known error messages, e.g., recorded in a computer readable form on a computer readable medium such as in a database or other memory structure or system. At stage 509, the probe compares the received error message to known error messages. If the received error message is matched to a known error message in stage at 509, the process 500 flows to stage 511, wherein the probe accesses an array of corrective data associated with the known error messages. In particular, each known error message is associated on the storage medium in the form of a table, linked array, etc., with at least one corrective action. At stage 513, the probe executes the corrective action or actions associated with the known error.

Corrective actions typically include known effective solutions to known errors. For example, an error message indicating that the called cellular number is not active may be associated with a corrective action that specifies steps for reactivating the device MIN/MDN via an interface with the appropriate carrier's provisioning system.

If the received error message is not matched with a known error message in stage 509, the process 500 flows instead to stage 515. At stage 515, the probe transmits the recorded error message to an advisor for resolution. The advisor may resolve the problem or may instruct the probe itself to resolve the problem, but in either case, the probe receives information specifying one or more corrective actions to resolve the error in stage 517. From this stage, the process 500 flows to stage 519, wherein the probe updates the record of known errors to include the instant error and an associated entry including the received corrective instructions.

It can be seen that by the conclusion of process 500, the subscriber connectivity issue has been checked with minimal advisor involvement, and if an error is found, the process resolves the error for known and unknown errors alike, while updating known error records to reflect any previously unknown errors.

In an alternative implementation, before passing an unknown error to the advisor, the probe may search an unknown error message for known words or phrases, and may take action based on identifying such words. For example, the words/phrases "inactive," "deactivated," "not available," "outside coverage area," etc. may be used to trigger specific corrective activities. If such corrective actions are successful, the error so identified may be added to the record of known errors.

In any of its implementations in keeping with the disclosed principles, the disclosed system allows a live advisor's manual process to be shortened through a three part automated process that not only assists with the immediate communication problem, but also allows the system to learn new errors and solutions to facilitate the solution of future communications problems. Whether the usage scenario involves an offline advisor working to resolve a subscriber communications issue or an inbound technical advisor, or even the batched automated check on a group of predefined vehicles, the described system reduces advisor workload while improving the subscriber experience.

It will also be appreciated, however, that the foregoing methods and implementations for solving subscriber communication problems are merely examples of the inventive principles, and that these illustrate only preferred techniques. It is contemplated that other implementations of the invention may differ in detail from foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A computer-implemented method of resolving a connectivity problem experienced by a user of a cellular communications device in attempting to use the cellular communications device by use of an automated probe, the method comprising:
   receiving, at a backend server, a call center request to address a connectivity problem for a cellular communications device;
   initiating, by an automated probe in association with processing the call center request, a data call to the cellular communications device, wherein the data call entails no audible ringing and no user interaction at the cellular communications device;
   receiving, by the automated probe, from the cellular communications device, an error message responsive to the data call, wherein the error message provides an error value relating to connectivity status of the cellular communications device;
   applying, after the receiving, the error value to an array of known error message values and corresponding corrective actions;
   determining whether the error message value is present in known error message values of the array of known error message values and corresponding corrective actions; and
   conditionally processing the error message value by:
      executing a corrective action corresponding to the error message value specified by an entry from the array of known error message values and corresponding corrective actions where a known error message value corresponds to the error message value; and otherwise
      transmitting the error message value to an advisor if the error message value is not present in the array of known error message values and corresponding corrective actions, receiving at least one additional corrective action, and updating the array of known error message values and corresponding corrective actions to include an additional error message entry specifying the error message value and a corresponding corrective action.

2. The method according to claim 1, wherein the receiving an error message comprises receiving an audible error message.

3. The method according to claim 2, wherein the determining whether the error message value is present in the known error message values comprises matching the error message value to an error message value for an entry of the array of known error message values and corresponding corrective actions.

4. The method according to claim 2, wherein the determining whether the error message value is present in the known error message values comprises matching a portion of the error message value to a like portion of an error message value for an entry the array of known error message values and corresponding corrective actions.

5. The method according to claim 1, wherein the array of known error messages and corresponding corrective actions includes one or more entries having corresponding corrective actions that specify transmitting instructions to a service provider associated with the cellular communications device.

6. The method according to claim 5, wherein the transmitted instructions include an instruction to reactivate one or both of a mobile identification number (MIN) or a mobile directory number (MDN) associated with the cellular communications device.

7. The method according to claim 1, wherein executing a corrective action comprises determining that execution of the at least one corrective action was successful and transmitting a success indicator to an advisor.

8. The method according to claim 1, wherein the initiating the data call follows a live advisor attempt to resolve the connectivity problem.

9. A computer-implemented method of resolving a connectivity problem experienced by a user of a cellular communications device in attempting to use the cellular communications device by use of an automated probe, the method comprising:
  initiating, on the automated probe, a test of the cellular connectivity of the cellular communications device, the test comprising:
    placing a data call to the cellular communications device, wherein the data call entails no audible ringing and no user interaction at the cellular communications device;
    receiving an error message responsive to the data call, wherein the error message provides an error value relating to connectivity status of the cellular communications device;
    applying, after the receiving, the error value to an array of known error message values and corresponding corrective actions;
    determining whether the error message value is present in known error message values of the array of known error message values and corresponding corrective actions; and
    conditionally processing the error message value by:
      executing a corrective action corresponding to the error message value specified by an entry from the array of known error message values and corresponding corrective actions where a known error message value corresponds to the error message value; and otherwise
      transmitting the error message value to an advisor if the error message value is not present in the array of known error message values and corresponding corrective actions.

10. The method according to claim 9, wherein transmitting the error message value to an advisor if the received message is not present in the array of known errors further comprises:
  receiving at least one additional corrective action, and updating the array of known error message values and corresponding corrective actions to include an additional error message entry specifying the error message value and a corresponding corrective action.

11. The method according to claim 9, wherein receiving an error message comprises receiving an audible error message.

12. The method according to claim 11, wherein the determining whether the error message value is present in the known error message values comprises matching the error message value to an error message value for a entry of the array of known error message values and corresponding corrective actions.

13. The method according to claim 11, wherein the determining whether the error message value is present in the known error message values comprises matching a portion of the error message value to a like portion of an error message value for an entry of the array of known error message values and corresponding corrective actions.

14. The method according to claim 9, wherein the array of known error messages and corresponding corrective actions includes one or more entries having corresponding corrective actions that specify transmitting instructions to a service provider associated with the cellular communications device.

15. The method according to claim 14, wherein the transmitted instructions include an instruction to reactivate one or both of a mobile identification number (MIN) or a mobile directory number (MDN) associated with the cellular communications device.

16. The method according to claim 9, wherein executing a corrective action comprises determining that execution of the at least one corrective action was successful and transmitting a success indicator to an advisor.

17. The method according to claim 9, wherein the initiating the data call follows a live advisor attempt to resolve the connectivity problem.

18. A non-transitory system for correcting a cellular connectivity error with respect to a vehicle telematics unit, the non-transitory system comprising;
  a dialer for placing an unmanned data call to the vehicle telematics unit;
  a known error store for recording known connectivity error indicators in conjunction with known corrective actions, each known error being associated in the store with at least one known corrective action; and
  an automated error corrector for detecting and recording an error message responsive to the data call placed to the vehicle telematics unit, wherein the automated error corrector comprises a processing hardware and a non-transitory computer readable medium comprising computer executable instructions that, when executed by the processing hardware, cause the system to perform a method comprising:
    initiating a data call to the cellular communications device, wherein the data call entails no audible ringing and no user interaction at the cellular communications device;
    receiving from the cellular communications device, an error message responsive to the data call, wherein the error message provides an error value relating to connectivity status of the cellular communications device;
    applying, after the receiving, the error value to an array of known error message values and corresponding corrective actions;
    determining whether the error message value is present in known error message values of the array of known error message values and corresponding corrective actions; and conditionally processing the error message value by:
executing a corrective action corresponding to the error message value specified by an entry from the array of known error message values and corresponding corrective actions where a known error message value corresponds to the error message value; and otherwise
transmitting the error message value to an advisor if the error message value is not present in the array of known error message values and corresponding corrective actions.

19. The non-transitory system for correcting a cellular connectivity error according to claim 18, wherein the conditionally processing further comprises in association with the transmitting:
receiving at least one additional corrective action, and
updating the array of known error message values and corresponding corrective actions to include an additional error message entry specifying the error message value and a corresponding corrective action.

20. The non-transitory system for correcting a cellular connectivity error according to claim 18, wherein the automated error corrector is further configured with computer-executable instructions facilitating parsing a previously unknown error message to identify one or more key words within the previously unknown error message.

21. The non-transitory system according to claim 18, wherein the receiving an error message comprises receiving an audible error message.

22. The non-transitory system according to claim 18, wherein the determining whether the error message value is present in the known error message values comprises matching the error message value to an error message value for an entry of the array of known error message values and corresponding corrective actions.

23. The non-transitory system according to claim 18, wherein the determining whether the error message value is present in the known error message values comprises matching a portion of the error message value to a like portion of an error message value for an entry of the array of known error message values and corresponding corrective actions.

24. The non-transitory system according to claim 18, wherein the array of known error messages and corresponding corrective actions includes one or more entries having corresponding corrective actions that specify transmitting instructions to a service provider associated with the cellular communications device.

25. The non-transitory system according to claim 24, wherein the transmitted instructions include an instruction to reactivate one or both of a mobile identification number (MIN) or a mobile directory number (MDN) associated with the cellular communications device.

26. The non-transitory system according to claim 18, wherein executing a corrective action comprises determining that execution of the at least one corrective action was successful and transmitting a success indicator to an advisor.

27. The non-transitory system according to claim 18, wherein the initiating the data call follows a live advisor attempt to resolve the connectivity problem.

* * * * *